July 3, 1923.

M. MAAG

DRAG SPINDLE GEAR

Filed Dec. 31, 1918

Inventor:
Max Maag
By [signature]
Atty.

Patented July 3, 1923.

1,460,552

UNITED STATES PATENT OFFICE.

MAX MAAG, OF ZURICH, SWITZERLAND.

DRAG-SPINDLE GEAR.

Application filed December 31, 1918. Serial No. 269,081.

*To all whom it may concern:*

Be it known that I, MAX MAAG, a citizen of the Republic of Switzerland, residing at Zurich, Hardstrasse 219, Switzerland, have invented certain new and useful Improvements in Drag-Spindle Gears; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

Drag-spindle gears are used for taking up the back-lash or lost-motion of movable parts of machines. A gear of this kind comprises usually a feed-spindle and a more rapidly driving drag-spindle receiving its drive from said feed spindle or from some independent source by means of a slipping clutch. These two spindles drive the part of the machine to be moved, eliminating thereby any back-lash or lost motion which would be otherwise present.

All drag-spindle gears hitherto proposed and adapted to run in a forward and backward direction present the drawback, that neither the feed-spindle nor the drag-spindle can be made self-stopping, i. e., provided with a thread the angle of inclination of which is less than the angle of friction as there would occur a clamping as soon as the gear runs in a backward direction. Consequently, any reacting force (for instance the pressure of the tool) and any accidental vibration is adapted to cause at any time a displacement of the part of the machine to be moved, so that the accuracy of work that has to be carried out is influenced in a very detrimental manner.

The object of the present invention is to provide a drag-spindle gear adapted to run in both directions and comprising a feed- and a drag-spindle which is self-stopping, so that any accidental displacement of the part of the machine to be moved is prevented under all circumstances.

This invention will now be more particularly described with reference to the accompanying drawing illustrating by way of example several embodiments of the invention.

In this drawing.

Figure 1:
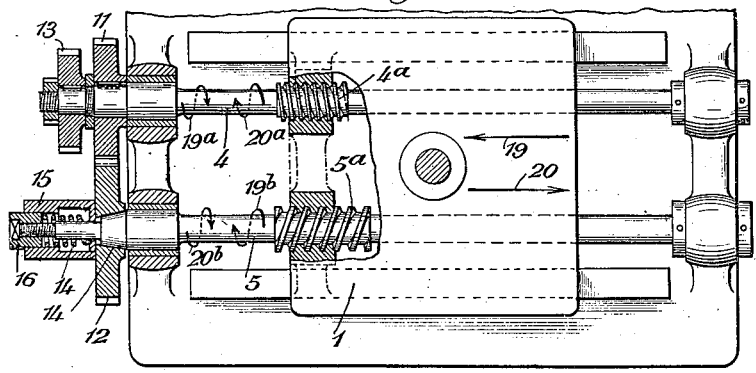
Fig. 1 shows a drag-spindle gear operative in one direction only.
Figure 2:
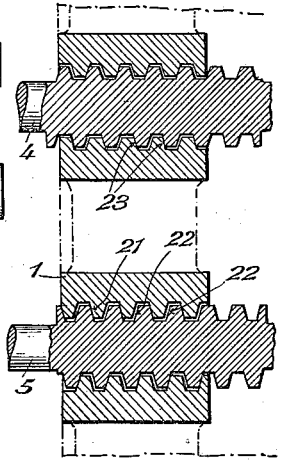
Fig. 2 is a cross-section on an enlarged scale through the screw-threaded portion and the nuts of the two spindles of the gear shown in Fig. 1.

The operation of the gear illustrated in Figs. 1 and 2 is as follows:

Let it be assumed that the slide 1 has to be moved alternately in the direction of the arrows 19 and 20. The drive is transmitted to the spur gear wheel 13 rigidly connected to the feed-spindle 4. The rotary movement of the latter is transmitted to the drag-spindle 5 by means of the spur gear wheels 11 and 12 and the slipping clutch 14, 15, 16. The spindle 5 is therefore frictionally driven from the spindle 4, but it is obvious that it may be frictionally driven from any other source. The spindles 4 and 5 are provided with a screw-thread $4^a$ and $5^a$, respectively, cooperating with corresponding nuts on the slide 1 to be moved. As shown in the drawing the two spindles 4 and 5 are connected by directly intermeshing gears so that they rotate in opposite directions. It is to be understood, however, that the gears 11 and 12 and the spindles 4 and 5 may be rotated by suitable mechanism in the same direction so that they would require screw threads running in the same direction. In view of the fact, that the spindles 4 and 5 rotate in different directions, the direction of their screw-threads is also a different one; in the embodiment shown the screw-thread $4^a$ is, for instance, right-handed and the screw-thread $5^a$ left-handed. The latter has moreover a greater pitch and drives faster than the screw-thread $4^a$. In case that the two threads must have the same pitch, a faster drive of the spindle 5 may be obtained by giving to the spur gear wheel 11 a greater diameter than to the spur gear wheel 12. In either case the spindle 4 has an effective speed slower than that of the spindle 5.

When the slide 1 has to be moved in the direction of the arrow 20, the spur gear wheel 13 as well as the spindle 4 must rotate in the direction of the arrow 20ª, the spindle 5 being then caused to rotate in the direction of the arrow 20ᵇ. Since, as stated, the screw-thread 5ª drives faster, so that the flanks 21 of its thread rest on the nut (Fig. 2), it moves the slide 1 continually to such an amount forward as the screw-thread 4ª will admit, which is thus caused to rest with its flanks 23 on the screw-threaded nut engaging it. Consequently, the spindle 5 is actually the driving spindle and is usually made stronger, whilst the spindle 4 determines only the exact amount of movement. For this reason the thread of the spindle 4 has to be cut with greater accuracy than that of the spindle 5. The latter is called accordingly drag-spindle whilst the spindle 4 is called feed- or standard-spindle. As long as the slide 1 is moved in the same direction the screws 4 and 5 operate satisfactorily.

Let it be assumed now, that the slide 1 moved until now in the direction of the arrow 20 has to be moved back in the opposite direction, i. e. in the direction of the arrow 19. Wheel 13 and spindle 4 rotate now in the direction of the arrow 19ª. Owing to the inevitable back-lash or lost motion between the teeth of the spur gear wheels 11, 12, the rotary movement of the spindle 4 is not transmitted however immediately to the spindle 5, so that the flanks 21 of its thread are still resting on the nut, notwithstanding the rotary movement imparted to wheel 13. This prevents the spindle 4 from imparting a movement to the slide 1 when the screw-threads are self-stopping, as in such a case there occurs (as may be seen by the position assumed by the bearing surfaces of the screw-threads in Fig. 2) a clamping and a stopping of both spindles. When, however, the screw-threads are made of greatly increased lead so as not to be self-stopping, the pressure of the screw-thread 4ª in the direction of the arrow 19 causes the nut of the screw-thread 5ª to turn the spindle 5 in the direction of the arrow 19ᵇ angularly to an amount corresponding to the back-lash or lost motion between the wheels 11, 12. Hereupon, wheel 12 effects the further rotation of the spindle 5, so that the flanks 22 of its thread are caused to rest on the nut engaging this spindle, and the screw-threads 5ª has a leading movement or a movement in advance relatively to the screw-thread 4ª. Assumed, however, that blank acted upon by the pressure of the tool, which pressure is directed oppositely to the direction of movement of the blank, is fixed to the slide 1, it is evident, that, particularly, when a step by step motion has to be imparted to the s'ide, the screw-threads of the spindles 4 and 5 could also be turned backwards by the nuts cooperating therewith. Any accidental vibration transmitted to the slide may also cause such a backward movement of the slide. In the design in which the screws are provided with greatly increased lead it is thus impossible to keep the slide at any time securely in a determinate position. If the screws are, as shown in Fig. 1, self stopping the mechanism is not reversible on account of the binding or cramping of the screws against opposite sides of the threads of the nuts in which they operate.

In the drag-spindle gear according to the present invention the drawbacks referred to are remedied and the use of self-stopping driving members permitted, so that any accidental displacement of the part of the machine to be moved in consequence of reaction forces, vibrations and the like is prevented under all circumstances.

Figure 3:
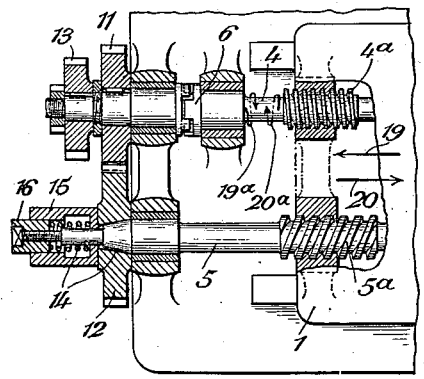
Fig. 3 shows a drag-spindle gear according to this invention actuating the slide of a machine tool.
Figure 4:
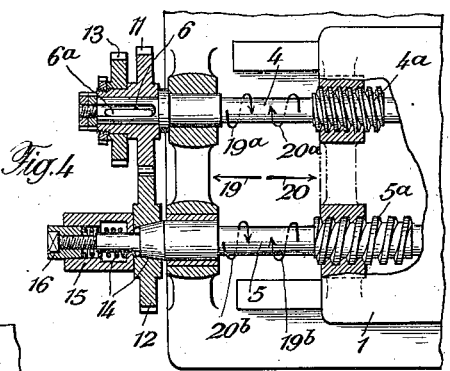
Fig. 4 shows a second embodiment of such a gear according to this invention.

In the embodiment of the invention illustrated in Figs. 3 and 4 at least one of the two-screw-threads 4ª and 5ª in self-stopping.

Referring to Fig. 3, it will be seen that the spindle 4 is divided into two parts behind the spur gear wheel 11. The gear 13 on the spindle 4 adjacent gear 11 may be operated in either direction by any suitable means and therefore forms reversible power means by means of which the spindles 4 and 5 may be rotated in either direction. The connection of the two parts of said spindle 4 is effected by a claw or tooth-coupling 6, having abundant clearance between its claws or teeth. The same result may be obtained in a design of the kind illustrated in Fig. 4, where the spindle 4 is left undivided and the wheel 13 is rigidly secured to the hub of the spur wheel 11. The latter is keyed to the spindle 4 by means of a key-way 6 and a key 6ª. The key-way 6 is considerably larger than the key 6ª, so that said two wheels can be rotated angularly relatively to the spindle 4. Upon a reversing of the direction of motion of the slide 1, i. e. when the slide is no longer moved in the direction of the arrow 20 but starts to move in the direction of the arrow 19 and the wheel 13 begins to rotate in the direction of the arrow 19ª instead of the arrow 20ª, the clearance provided between the claws or teeth of the coupling 6 (Fig. 3), or between the key-way 6 of the spindle 4 and the key 6ª (Fig. 4), has the effect to impart to the spindle 5 a leading motion, i. e. to cause said spindle to move in advance relatively to the spindle 4. In other words, at each reversal of motion of the gear 11, this gear has a limited idle rotary movement relative to the screw threaded part 4ª of the spindle 4. The screw 4ª therefore remains ineffective for an instant upon each reversal of motion until the drag-spindle 5 begins to drive the table in the opposite direction. In view of what has been explained hereinbefore with regard to Figs. 1 and 2, it will be seen, that any clamping between the screw-threaded parts is prevented, notwithstanding the fact that the one or the other of the two screw-threads 4ª, 5ª, or both of them, are self-stopping.

Figure 5:
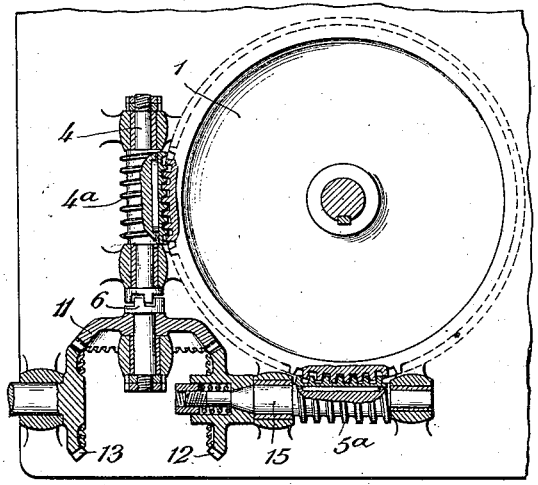
Figs. 5 and 6 show further embodiments of the improved gear adapted to be used for actuating a revolving table of a machine.

In the construction shown in Fig. 5, the drive is transmitted at the beginning of each reversing of motion at first from the bevel wheel 13 to the bevel wheel 11 and from the latter to the bevel wheel 12 and the drag-spindle 5 provided with a worm 5ª engaging into the teeth of the toothed rim of a revolving table 1, a rotation of the part of the feed-spindle 4 provided with a screw thread 4ª being only brought about after an angular rotation of the wheel 11 to an amount corresponding to the play between the claws or teeth of the coupling 6.

Figure 6:
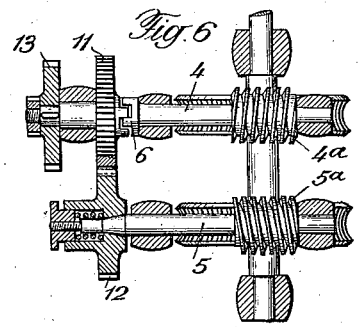

In the embodiment illustrated in Fig. 6, the drive is transmitted at the beginning of each reversing of motion from the wheel 13 to the wheels 11, 12 and to the self-stopping worm wheel 5ª before any motion is imparted to the spindle 4 with the self-stopping worm 4ª.

I claim:—

1. A drag-spindle gear, comprising a feed-spindle consisting of two parts, one of which is provided with a self-stopping screw-thread, a claw-coupling connecting said two parts of the feed-spindle and having a clearance between its claws, means adapted to impart to said spindle a motion in opposite directions, a toothed wheel fixed to the feed-spindle, a drag-spindle also provided with a self-stopping screw-thread, the screw-threads of the two spindles being oppositely directed, means cooperating with said toothed wheel on the feed-spindle for transmitting the motion of the feed-spindle to the drag-spindle, and a movable member provided with screw-threaded parts engaging with the screw-threaded parts of the spindles, said claw-coupling being provided between the toothed wheel fixed to the feed-spindle and the screw-threaded part of the latter, so that the drive is transmitted upon a reversing of motion to the drag-spindle before it is transmitted to the screw-threaded part of the feed-spindle.

2. A drag spindle gear, comprising a driven feed spindle, means interposing said spindle to permit a small amount of idle movement, a drag spindle geared to said feed spindle and a slipping clutch for the drag spindle.

3. A drag spindle gear comprising in combination, a reversibly driven feed spindle, means interposed in said spindle to permit a small amount of idle movement, a drag spindle adapted to operate at a different speed than said feed spindle, and a slipping clutch for said drag spindle.

4. A driving means for a reciprocatory element comprising in combination, a positive drive mechanism therefor, a frictional drive mechanism therefor adapted to move said element at a different speed than said positive speed and a coupling in said positive drive mechanism permitting a limited idle rotary movement of said positive driving means before driving said reciprocatory element upon each reversal of movement.

5. A driving means for a reciprocatory element comprising in combination, a positively rotated screw, means to rotate said screw in either direction, a frictionally rotated screw, said screws adapted to advance the reciprocatory element at different speeds, and a coupling in the driving mechanism for said positively driven screw permitting a limited idle movement of the driving means for said latter screw.

6. A drag spindle gear comprising in combination, an element to be moved, reversible power means, and two driving spindles for the said element connection, respectively, positively and frictionally to the power means, the said positive connection serving to operate its spindle at an effective speed slower than that of the other spindle, and a loose connection between one of the spindles and the power means permitting that spindle, upon reversal of the power means, to remain ineffective for an instant until the other spindle becomes effective to move said element in the opposite direction.

7. A drag spindle gear comprising in combination, an element to be moved, reversible power means, and two driving spindles for the said element connected, respectively positively and frictionally to the power means, the power connections for said frictionally driven spindle having lost motion therein, the said positive connection serving to operate its spindle at an effective speed slower than that of the other spindle and also permitting a limited idle rotary movement between said positive connection and its spindle, whereby upon reversal of the power means, the spindle remains ineffective for an instant until the other spindle overcomes lost motion between its driving connections and becomes effective to move said element in the opposite direction.

8. A drag spindle gear comprising in combination, an element to be moved, reversible power means, and two self-stopping driving spindles for the said element connected respectively, positively and frictionally to the power means, the said positive connection serving to operate its spindle at an effective speed slower than that of the other spindle, and a loose connection between one of the spindles and the power means permitting that spindle, upon reversal of the power means, to remain ineffective for an instant until the other spindle becomes effective to move said element in the opposite direction.

9. A drag spindle gear comprising in combination, an element to be moved, reversible power means, and two self-stopping driving spindles for the said element connected, respectively, positively and frictionally to the power means, the said positive connection serving to operate its spindle at an effective speed slower than that of the other spindle, and a loose connection permitting a limited idle rotary movement between said positive connection and its spindle, whereby upon reversal of the power means, the spindle remains ineffective for an instant until the other spindle becomes effective to move said element in the opposite direction.

10. A drag spindle gear comprising in combination, an element to be moved, reversible power means, and two self-stopping driving spindles for the said element connected, respectively, positively and frictionally to the power means, the said positive connection being in alignment with its spindle and serving to operate its spindle at an effective speed slower than that of the other spindle and also having a loose connection comprising a toothed clutch permitting its spindle, upon reversal of the power means, to remain ineffective for an instant until the other spindle becomes effective to move said element in the opposite direction.

11. A drag spindle gear comprising in combination, an element to be moved, reversible power means, and two driving spindles for the said element to drive said element in a rectilinear path, connected, respectively, positively and frictionally to the power means, the said positive connection serving to operate its spindle at an effective speed slower than that of the other spindle, and a loose connection between said spindle and the power means permitting its spindle, upon reversal of the power means, to remain ineffective for an instant until the other spindle becomes effective to move said element in the opposite direction.

12. A drag spindle gear comprising in combination, an element to be moved, reversible power means, and two self-stopping driving spindles for the said element to drive said element in a rectilinear path, connected, respectively, positively and frictionally to the power means, the said positive connection serving to operate its spindle at an effective speed slower than that of the other spindle, and a loose connection between said spindle and the power means also permitting its spindle, upon reversal of the power means, to remain ineffective for an instant until the other spindle becomes effective to move said element in the opposite direction.

13. A drag spindle gear comprising in combination, an element to be moved, reversible power means, and two self-stopping oppositely threaded driving spindles for the said element to drive said element in a rectilinear path, connected, respectively, positively and frictionally to the power means, and connected together by directly intermeshing gears, the said positive connection serving to operate its spindle at an effective speed slower than that of the other spindle and having a loose connection therein permitting its spindle, upon reversal of the power means, to remain ineffective for an instant until the other spindle becomes effective to move said element in the opposite direction.

In testimony that I claim the foregoing as my invention, I have signed my name.

MAX MAAG.